US007807970B2

(12) United States Patent
Richard

(10) Patent No.: US 7,807,970 B2
(45) Date of Patent: Oct. 5, 2010

(54) OBSTRUCTION DETECTION DEVICE

(75) Inventor: Matthieu Richard, Fourcatier (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/913,790

(22) PCT Filed: Feb. 20, 2006

(86) PCT No.: PCT/EP2006/060089

§ 371 (c)(1),
(2), (4) Date: Nov. 7, 2007

(87) PCT Pub. No.: WO2007/095992

PCT Pub. Date: Aug. 30, 2007

(65) Prior Publication Data

US 2009/0127465 A1 May 21, 2009

(51) Int. Cl.
*G01J 5/54* (2006.01)

(52) U.S. Cl. .................................... 250/338.1; 250/343

(58) Field of Classification Search .............. 250/338.1, 250/342, 343; 340/555
See application file for complete search history.

(56) References Cited

U.S. PATENT DOCUMENTS 5,243,326 A * 9/1993 Disabato ..................... 340/555
5,499,016 A 3/1996 Pantus
5,831,529 A * 11/1998 Pantus ........................ 340/555
5,942,976 A 8/1999 Wieser et al.
6,262,661 B1 * 7/2001 Mahler et al. ............... 340/567
6,377,174 B1 * 4/2002 Siegwart et al. ............. 340/541
6,469,625 B1 * 10/2002 Tomooka .................... 340/556
6,529,129 B1 * 3/2003 Tomooka .................... 340/556
2005/0030180 A1 * 2/2005 Pantus et al. ................ 340/556
2005/0200473 A1 * 9/2005 Noguchi et al. ............. 340/507

FOREIGN PATENT DOCUMENTS

EP 0 660 284 6/1995
EP 0 772 171 5/1997
EP 0 817 148 1/1998
EP 1 126 430 8/2001
JP 110250362 9/1999

* cited by examiner

*Primary Examiner*—David P Porta
*Assistant Examiner*—Marcus H Taningco
(74) *Attorney, Agent, or Firm*—Michael J. Striker

(57) ABSTRACT

The obstruction detection device for an infrared intruder detection system comprises at least one transparent facet having a roughened surface; a light emitter arranged for emitting light towards the roughened surface; a light detector arranged for detecting the intensity of light, which is transmitted or reflected or diffracted by the roughened surface into a specific direction of space; and an output device for outputting an alarm-signal, when an absolute difference between the intensity of the detected light and a reference value exceeds a threshold value. A liquid or spray applied onto the roughened surface changes its scattering patterns. This change triggers the alarm-signal.

9 Claims, 4 Drawing Sheets

OBSTRUCTION DETECTION DEVICE

BACKGROUND OF THE INVENTION

The present invention relates to an obstruction detection device, in particular to an infrared intruder detection system.

Passive infrared detection systems are widely used in intruder detection systems. Their underlying principle is to detect far infrared radiation (wavelength greater than 10 μm). This radiation is emitted by any warm body, e.g. by a human, vehicle. A respective infrared sensor is commonly placed behind an entrance window to protect the sensor against the environment.

At daytime, most intruder detection systems are deactivated. An intruder can now manipulate the passive infrared detectors such that they remain inactive permanently. One kind of manipulation is to disguise the entrance window by a spray or liquid, which is opaque for far infrared radiation, but transparent for visual or near infrared radiation. Maintenance staff of the intruder detection system cannot see this spray and detect the manipulation of the passive infrared detector just by a glance.

According to EP 0 660 284 A1 a near infrared emitter is placed outside of an entrance window of a passive infrared detector. The emission angle of the emitter is very broad, and a part of the near infrared light will be detected by a near infrared sensor placed behind the entrance window. A spray applied to the entrance window, that is opaque for near infrared radiation will be easily detected. A spray transmittive for near infrared radiation instead can be used to sabotage a passive infrared detector.

EP 0 772 171 A1 describes a sabotage detection system, which uses a diffractive surface. Light from a light source is focussed to a detector by the diffractive surface. A spray applied to the structured diffractive surface changes the diffractive pattern and the focus point. This leads to a change in the intensity of light detected by the detector. Unfortunately, it is difficult to manufacture the complex diffractive surface in cheap and widely used synthetic materials.

U.S. Pat. No. 5,499,016 and EP 0 817 148 A1 propose to use an infrared emitter and a detector both arranged at the outer side of the entrance window. The infrared radiation of the emitter is scattered on the surface and in volume of the entrance window. The volume scattering is dominant. The reflected parts are detected by the near infrared detector. A spray applied to the surface of the entrance window partly changes the reflective properties of the entrance windows and thus the intensity detected by the near infrared detector. A spray applied to the entrance window will basically form a smooth film. The differences of the surface properties of the entrance window and the liquid contribute to a change of the intensity of light scattered to the detector. This change, however, is very small. The dominate part of the light scattered by the volume is not affected by the liquid and remains unchanged. Thus highly sensitive detectors are necessary in order to measure the small change. The mechanical set-up of EP 0 817 148 A1 uses light guides for emitting and detecting light to and from the entrance window, respectively. A grazing incidence of the light is achieved, which increases the sensitivity on a spray applied to the entrance window, but on the expense of a complex mechanical light guide structure.

SUMMARY OF THE INVENTION

The present invention provides a simple device for detecting a spray attack, in particular on an entrance of a window of a passive infrared detection system, or a colour attack shielding the entrance window. This is achieved by the obstruction detection device of the present invention.

The obstruction detection device for an infrared intruder detection system comprises at least one transparent facet having a scattering roughened surface; a light emitter arranged for emitting light towards the roughened surface; a light detector arranged for detecting the intensity of light, which is transmitted or reflected or diffracted by the scattering roughened surface into a specific direction of space; and an output device for outputting an alarm-signal, when an absolute difference between the intensity of the detected light and a reference value exceeds a threshold value.

The roughened surface diffuses light or scatters light into a plurality of directions, basically random directions. When a spray or liquid is applied to the roughened surface it tends to fill all the gaps of the roughened facet. The refractive index of the liquid, about 1.3, and the refractive index of the transparent materials for the light path, about 1.4 to 1.5, are approximately identical. Thus the interface of the transparent material and the liquid scatters light less. The ability of the roughened surface to scatter light is reduced significantly. The liquid itself forms a planar and smooth surface. The planar surface of the liquid does not scatter light in random directions. In summary due to the spray, light passing through or reflected by the roughened surface is directed into a small solid angle.

The difference of scattering the light into random direction and scattering into a quasi-single direction is measured as difference in the intensity per solid angle. It depends on the geometric arrangement of the first facet with respect to the second facet, whether the intensity of light detected by the light detector increases or decreases, when a spray is applied.

The underlying principal remains the same for light reflected at the roughened facet. The angular distribution of the reflected light depends on the presence of spray on roughened surface. Accordingly, the intensity of light changes when a spray is applied.

Instead of determining the absolute difference between the intensity of the detected light and a reference value and comparing the difference to the threshold value, the intensity can be compared to an lower and an upper threshold value. These two schemes are mathematically isomorph and thus give the same results.

According to an embodiment the obstruction device comprises a first light guide, which first ending forms a first facet of the at least one transparent facets; a second light guide, which first ending forms a second facet of the at least one transparent facets; the light emitter being coupled to the first light guide and the light detector being coupled to the second light guide.

According to an embodiment the first facet and the second facet are facing each other. The first facet and the second facet can be tilted with respect to each other, as well. The geometric arrangement influences only if the intensity of detected light increases or decreases when spray is applied to the roughened surface.

According to an embodiment the roughened surface of the at least one facets is arranged close beside to an entrance window of the infrared intruder detection system and is exposed such that a spray applied to the entrance window is necessarily applied to the roughened surface, too.

According to an embodiment the roughened surface has a mean granularity of 5 μm to 70 μm. The roughened facet can be formed by sandpaper having a granularity below 70 μm or sandblasting with sand having a granularity below 70 μm.

According to an embodiment the first light guide and the second light guide are formed in a single piece.

According to an embodiment a further light detector is arranged for determining the intensity of light reflected at the first facet back into the light guide and a further output device for outputting a further alarm-signal is provided, when an absolute difference between the intensity of the reflected light and a further reference value exceeds a further threshold value.

BRIEF DESCRIPTION OF THE DRAWINGS

The present invention will be described in detail with exemplary embodiments and figures.

DETAILED DESCRIPTION OF THE PREFERRED EMBODIMENTS

Figure 1:
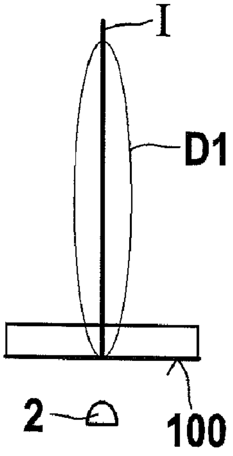
FIGS. 1 and 2 illustrate an underlying principle.

In the drawings, like numerals refer to the same or similar functionality throughout the several figures.

Figure 2:
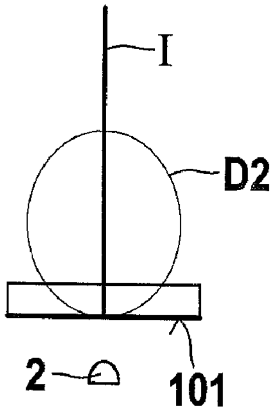

FIG. 1 and FIG. 2 are illustrating an underlying principle of the present invention. A collimated ray I is emitted by a light emitter 2. The light passes through a transparent material having a planar surface 100. Irregularities in the non-perfectly planar surface 100 deflect the light into directions other than the emission direction. At a basically planar surface, the distribution of the intensity density of light per solid angle reduces rapidly with increasing angle with respect to the emission direction. At a roughened surface 101 the distribution D2 of the intensity density declines less rapidly. The light is scattered in almost any direction with the same probability.

Instead of a light emitter 2 a light detector can be placed below the roughened surface 101. The roughened surface 101 deflects a part of light incoming from almost any direction onto the light detector. A smooth and planar surface just transmits light to the detector according to the known physical relations of the refraction without any diffraction or scattering. Thus most of the light incoming will not be redirected to the detector in presence of the spray.

Figure 3:
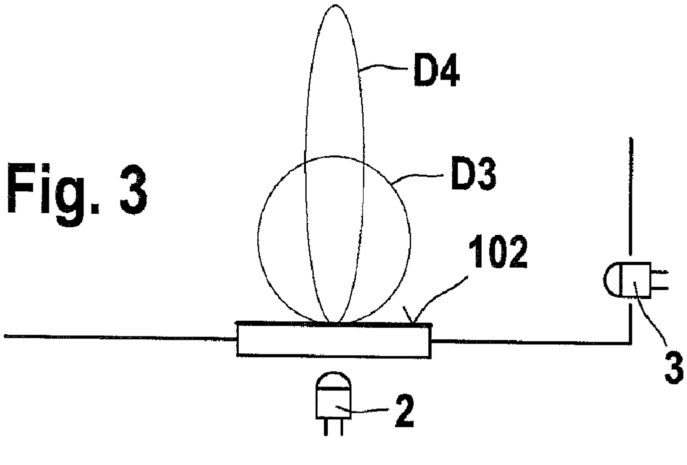
FIG. 3 illustrates a basic setup of an embodiment.

A basic setup of the invention is illustrated in FIG. 3. A light emitter 2 emits its light onto a roughened surface 102. A detector 3 is directed towards the roughened surface. But the detector 3 is not arranged in the geometric light path of light emitted by the light emitter 2. In the standard situation the emitted light will be distributed according to an isotropic or broad distribution D3. Thus, a fraction of light will be detected by the detector 3. The situation changes, when someone applies a transparent liquid onto the surface 102. The liquid smoothes the surface 102 to a quasi-planar surface. Accordingly, the distribution of light changes to the narrower distribution D4. The amount of light arriving at the detector 3 decreases. This decrease is compared to a predetermined threshold value. If the intensity is below this threshold value an alarm signal is put out.

The smoothing of the roughened surface 102 by the liquid is possible, because the transparent material of surface 102 has a refractive index of 1.4 to 1.5 and the liquid a similar refractive index of about 1.3. Thus, the contribution of refraction at the interface of liquid and the transparent material is highly reduced. Additionally, a liquid tends to form a rather smooth and planar surface. Due to these reasons a distribution becomes narrower when a spray is applied to the roughened surface 102.

It should be noted that the emitter and the detector can be interchanged. The roughened surface 102 deflects a fraction of the light incoming towards the detector. When a spray is applied the roughened surface predominantly transmits the light only. The light will miss the detector because of the geometric arrangement as shown in FIG. 3.

Figure 4:
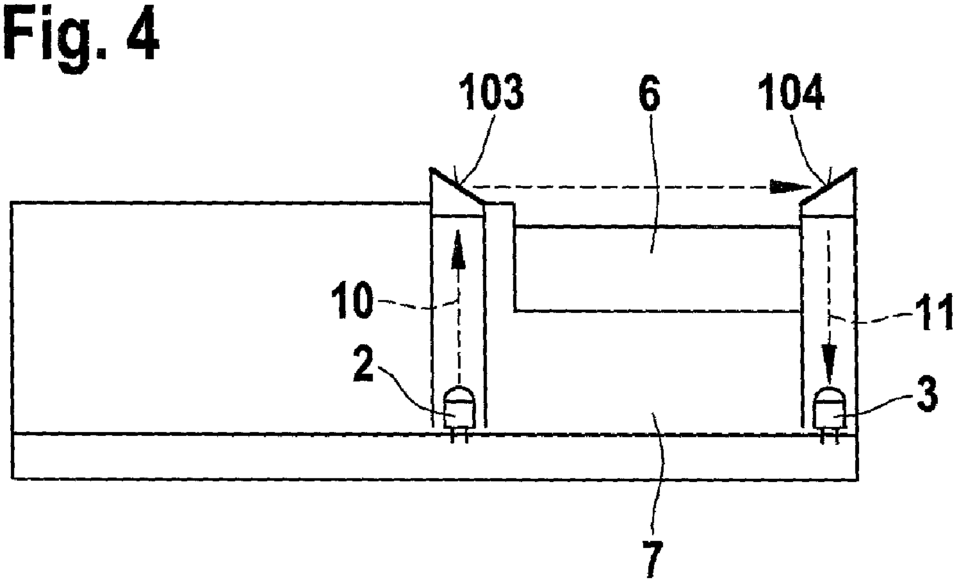
FIG. 4 illustrates a first embodiment.

In FIG. 4 a cross section for a passive infrared detection system is illustrated. The infrared detector 7 has an entrance window 6. The roughened facets 103 and 104 are arranged closely to a side of the entrance window 6. A light emitting diode 2 emits light in a light channel 10 directed to the first roughened facet 103. A part of a diffusive scattered light is directed versus the second roughened facet 104. Light from the second roughened facet 14 passes through the second light channel 111 to the detector 3. The intensity of the light is compared to a predetermined threshold.

When a spray is applied to the first roughened facet 103 less light is scattered into the direction of the second facet 104. The intensity of light in the second light channel is reduced. An alarm is triggered when the intensity of light in the second light path 11 decreases below the predetermined threshold value.

Light falling onto the second roughened facet 104 is scattered in almost any direction. Therefore, a small fraction of incoming light is directed towards the detector 3 regardless where the light comes from. But when a spray is applied onto the second roughened facet 104, the light is only subdued to the reflection at the surface and the refraction. These two mechanisms direct the rays of light coming from the first facet 103 into well defined directions in solid space. The detector 3 is arranged out of reach of these latter rays. Thus the intensity of light measured by the detector is reduced when a spray is applied. Accordingly, an alarm is triggered when the intensity decreases below the predetermined threshold value.

Figure 5:
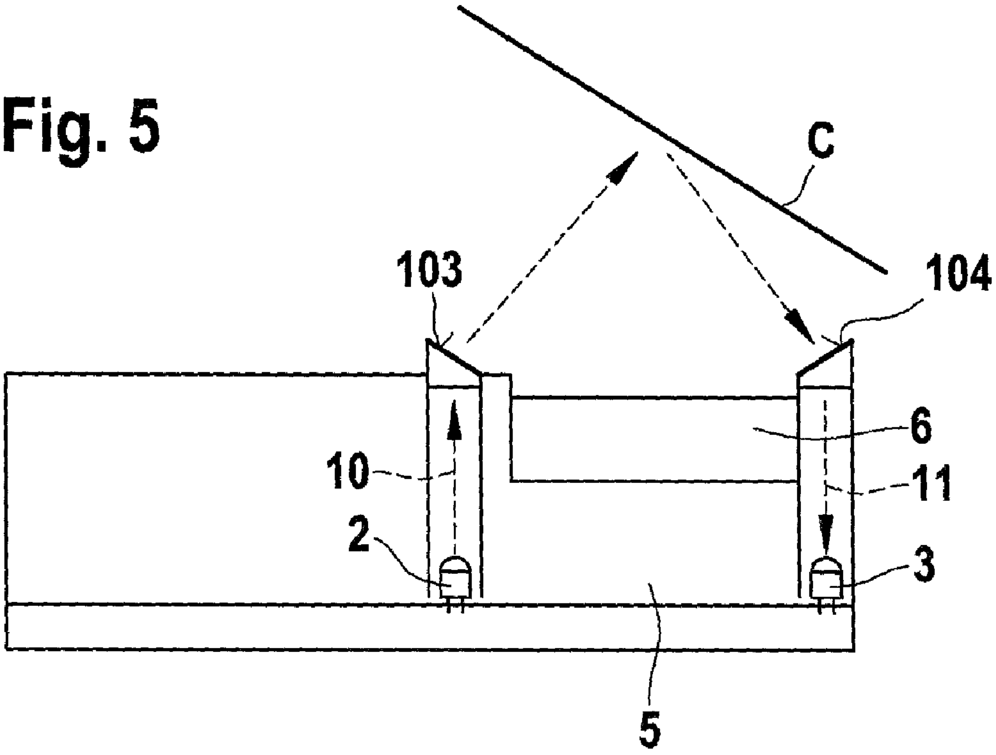
FIG. 5 illustrates a cover attack on the embodiment of FIG. 4.

FIG. 5 illustrates that a device of FIG. 4 may be as well used to detect a cover attack. For such an attack a sheet of paper or the like is used in order to shield the entrance window 6. This cover C, however, reflects light emitted by the diffusive and rough facet 103 towards a second facet 104. Thus, the detector 3 detects an increase of the intensity of light.

The electronic circuits necessary basically consist of a simple comparator comparing the detected intensity with the threshold value. A further advanced electronic circuit uses two comparators for comparing the detected intensity with a threshold value above and a threshold value below a reference value.

Figure 6:
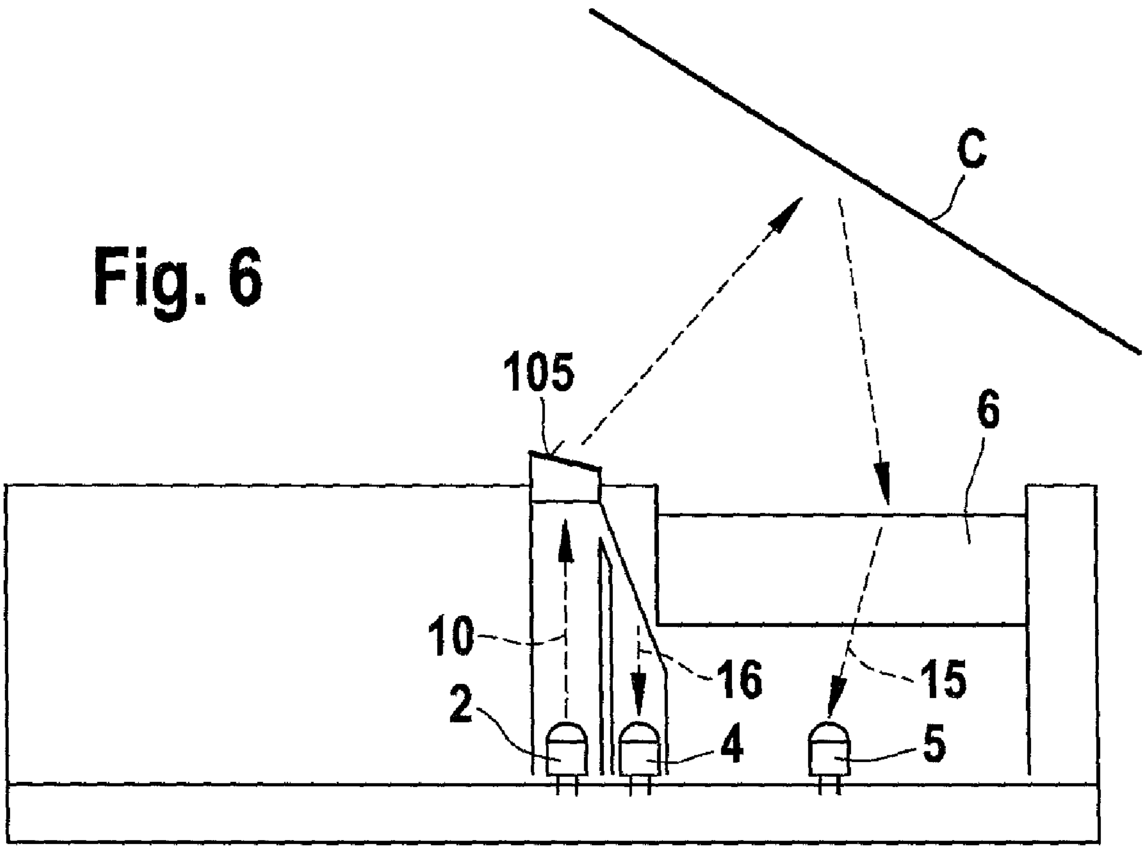
FIG. 6 illustrates a second embodiment.

In FIG. 6 a further embodiment of the present invention is illustrated. Just one rough facet 105 is used. Light emitted by a light emitter 2 is guided along a first light path 10 and reflected in part by the roughened surface 105 back into a second light path 16. A detector 4 placed in the second light path detects the intensity of the reflected light. The fraction of light backscattered at the roughened surface 105 depends on the roughness of the surface. By applying a spray onto the roughened surface 105 the roughness decreases. Accordingly, the intensity of the backscattered light changes.

In order to detect a cover attack a second detector 5 may be placed behind the entrance window 6. The second detector 5 detects light reflected at the surface of the cover C.

Figure 7:
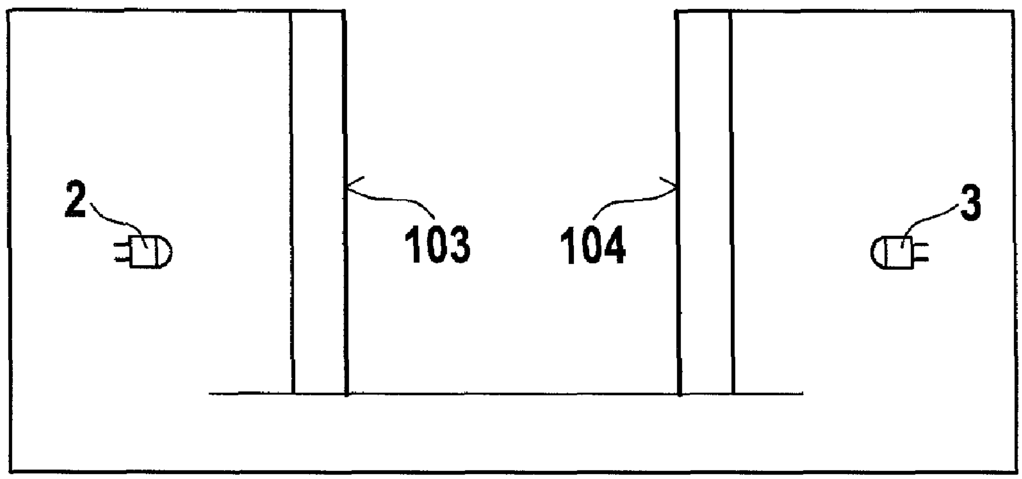
FIGS. 7 and 8 illustrate further embodiments.

The facets 103, 104 can be facing each other (FIG. 7). In this case, the intensity of light in the second light path 111 increases when a spray is supplied to the surfaces. The roughened surfaces diffuse the light. The intensity per solid angle is reduced. Due to the spray, the roughened surfaces stop to diffuse the light. In consequence the intensity of light per solid angle increases along the geometric light path. The signal of the light detector increases. The obstruction alarm is triggered when the signal increases above a predetermined threshold value.

Figure 8:
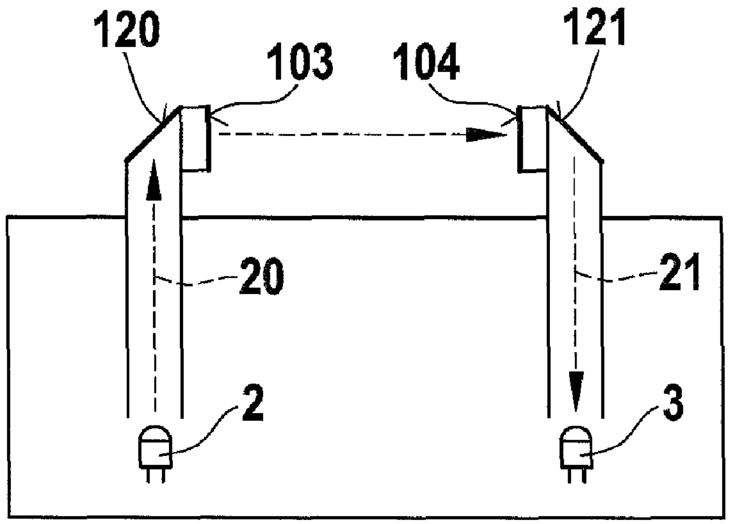

FIG. 8 shows a further arrangement of the facets 103, 104. Two light guides 20, 21 are provided. They are ending each in a tilted surface 120, 121, which reflects light injected into the light guide 20, 21. The tilted surface may be covered with a mirror in order to increase their reflectivity. The roughened facets 103, 104 are arranged at the side of the ending of the light guides. The intensity of light detected by the light detector increases when spray is applied.

The roughened surfaces may be formed by transparent plastics or glass, which is sandblasted or polished with sand paper having a granularity of the standard type 1200.

The invention claimed is:

1. An obstruction detection device for an infrared intruder detection system, comprising:

a first light path (10), wherein a first ending of said first light path (10) forms at least one transparent facet (103, 104, 105) having a roughed surface;

a light emitter (2) arranged for emitting light, wherein said light is guided along the first light path (10) towards the roughened surface;

a light detector (4) arranged for detecting the intensity of light, which is reflected by the roughened surface back into a second light path (16); and an output device for outputting an alarm-signal, when an absolute difference between the intensity of the detected light and a reference value exceeds a threshold value, wherein the roughened surface of the at least one facet is arranged adiacent to an entrance window of the infrared intruder detection system and is exposed such that a spray applied to the entrance window is necessarily applied to the roughened surface.

2. The obstruction detection device according to claim 1, further comprising a first light guide (10) and second light guide (11), wherein a first ending of said second light guide forms a second facet (104) of the at least one transparent facet, the light emitter (2) being coupled to the first light guide (10) and the light detector being coupled to the second light guide (11).

3. The obstruction detection device according to claim 2, wherein the at least one facet (103) and the second facet (104) are facing each other.

4. The obstruction detection device according to claim 2, wherein the at least one first facet (103) and the second facet (104) are tilted with respect to one another.

5. The obstruction detection device according to claim 2, wherein the first light guide (10) and the second light guide (11) are formed in a single piece.

6. The obstruction detection device according to claim 2, wherein a further light detection detector (3) is arranged for determining the intensity of light reflected at an obstacle and a further output device for outputting a further alarm-signal is provided, when an absolute difference between the intensity of the reflected light and a further reference value exceeds a further threshold value.

7. The obstruction detection device according to claim 1, wherein the roughened surface has a mean granularity of 5 μm to 70 μm.

8. The obstruction detection device according to claim 1, wherein the roughened facet is formed by a sandpaper having a granularity below 70 λm or sandblasting with sand having a granularity below 70 μm.

9. The obstruction detection device according to claim 1, wherein the output device is provided for outputting an alarm-signal when an intensity of the detected light falls below a lower threshold value or increases above an upper threshold value.

* * * * *